July 16, 1929.  R. W. SILER  1,721,357

METHOD OF TREATING METALLIC BODIES

Filed May 25, 1928

INVENTOR.
Robert W. Siler,
BY Geo. P. Kimmel.
ATTORNEY.

Patented July 16, 1929.

1,721,357

UNITED STATES PATENT OFFICE.

ROBERT W. SILER, OF LONG BEACH, CALIFORNIA.

METHOD OF TREATING METALLIC BODIES.

Application filed May 25, 1928. Serial No. 280,641.

This invention relates to a method of treating metallic bodies and has for its object to provide, in a manner as hereinafter set forth for treating of metallic bodies by magnetic force to render such bodies heat resistant to prevent a change in the form of the body when the latter is subjected to high temperatures.

It is well known that when a very high temperature, such as an electric arc, is brought into contact with an ordinary metal, that the metal gives away in a manner to change its form, which is due to the molecules of the metal being unorganized. When an ordinary metal body is subject to a very high temperature, molecules of such body are continuously working against each other, and such molecules become agitated, and retreat from the heat at a terriffic speed. Each molecule will take its own course and naturally collides into any molecule that happens to be in its course. The higher the temperature the greater the number of collisions of the molecules per second and at a certain temperature, depending entirely on the kind of metal being treated, the metal will lose its form. Therefore a magnetic force developed in accordance with this invention may be employed to organize the molecules and prevent them from becoming agitated, and have every molecule serve as a foundation and support to every other molecule in the metal. Such organization of the molecules, so that one will support the other, will render the metallic body heat resistant subjected to high temperatures and prevent a change in the form of the body.

An apparatus capable of carrying out a method in accordance with this invention and for the purpose set forth is illustrated by the accompanying drawings and in which.

Figure 1:
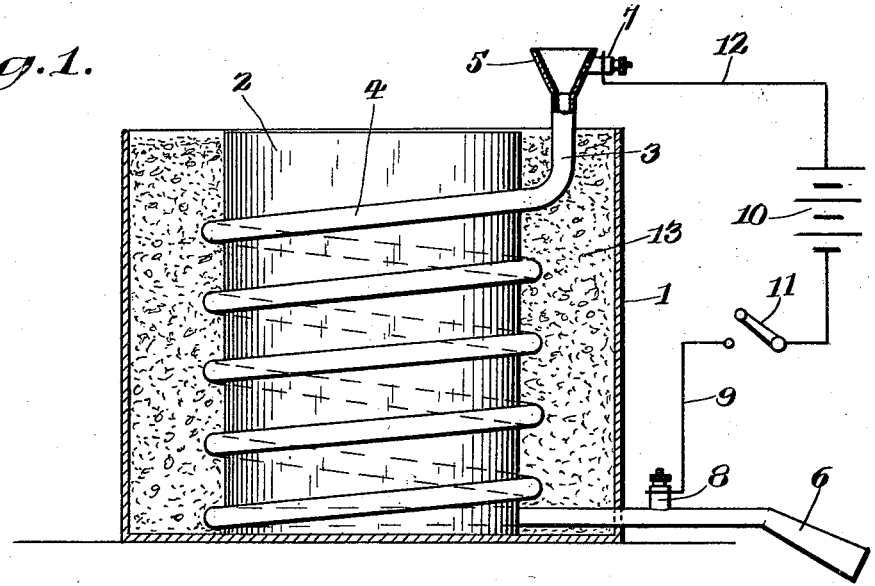
Figure 1 is a sectional elevation of the apparatus.

In carrying out the method there is employed an electrical conductor in the form of a tube having a coil intermediate its ends. The tube is insulated electrically and the coil is also insulated against high and low temperature by means of wood, wool or sand or other suitable means. Liquid air is passed through the tube. Liquid air throws off magnetic force. Electricity passing through the conductor throws off magnetic force. Both liquid air and electricity passing through the same conductor throws off a magnetic acting in a manner as described herein.

Referring to the drawing 1 denotes an open top casing providing a container, 2 indicates a cylinder mounted within the container and spaced from the body portion of the latter. The cylinder 2 is open at its upper end and provides a receptacle for the metallic bodies to be treated. Extending into the container from the top thereof and projecting therefrom in proximity to its bottom is an insulated copper tubing 3 having a portion thereof, intermediate its ends, coiled as at 4 and with the coiled portion surrounding and snugly engaging the cylinder 2. The tubing 3 at its upper end has a funnel shaped intake 5 and at its lower end is formed with an enlarged outlet or discharge portion 6. The upper end of the tubing 3 is provided with a binding post 7 and its lower portion with a binding post 8 and both of which are arranged exteriorly of the container. A source of electrical supply is indicated at 10 and leading from the post 8 to the source 10 is a circuit conductor 9 having interposed therein a switch 11. Leading from the source 10 to the post 8 is a circuit conductor 12. The current employed is a direct one. Arranged within the container 1 is a body of cellular material 13, preferably sawdust providing a heat insulator. It is to be understood that the body 13 can be of any other suitable material such as wool, asbestos, etc. The current employed, however, must be a direct one.

Figure 2:
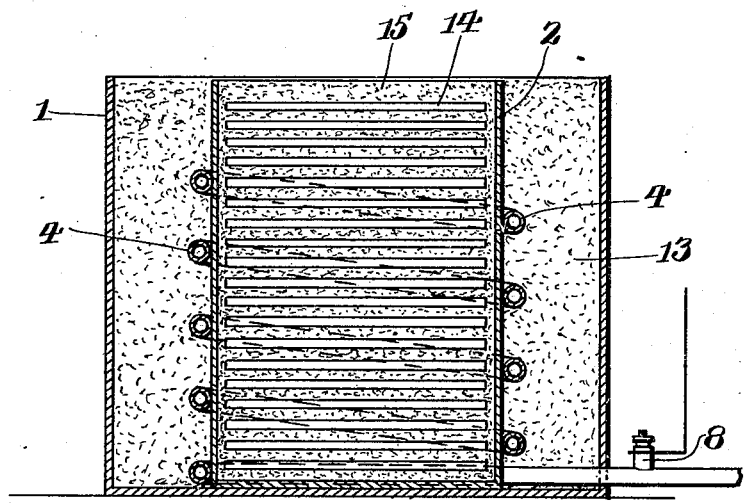
Figure 2 is a vertical sectional view thereof.

In Figure 2 of the drawings there is illustrated within the cylinder 2 the metallic bodies 14 to be treated, and which are arranged in superposed spaced relation and embedded in a body of sawdust 15 and with the sawdust arranged between and covering the metallic bodies 14.

When treating metallic bodies to render them heat resistant by the magnetic force developed, in accordance with this invention, a thin layer of sawdust is placed upon the bottom of the cylinder 2, and mounted thereon is a metallic body to be treated. The body is covered completely with sawdust and upon the latter is placed another metallic body to be treated and another layer of sawdust, and so on until the cylinder is filled with sawdust and the metallic bodies to be treated and with the sawdust alternately arranged with respect to said bodies. The container 1 is filled with sawdust and the latter is to completely enclose the coiled portion 4 of the hollow copper tubing. The cylinder 2 may be formed of brass or copper or any material. The cylinder 2 in connection with the coil 4 constitutes a magnet.

After the metallic bodies are arranged in position to be treated the sawdust around the copper tubing winding is saturated with liquid air to chill the winding as D. C. supply is turned on, after which the operator pours liquid air through the tubing and which is continued until the bodies are treated to the desired extent. The current is then turned on and the direct current passes through the copper tubing simultaneously with the passage of the liquid air through the tubing and which developes the new force. After the current is turned on and the tube filled with liquid air, the sawdust on the articles to be treated is saturated with liquid air. The sawdust is continuously saturated with liquid air both inside and outside the winding. The tubing is filed with liquid air and the current is continuously flowing through the tubing. The foregoing operation is continued until the metallic bodies have the desired qualities, after which the current is turned off and the supply of liquid air discontinued and the particles which have been made heat resistant removed from the cylinder 2.

What I claim is:

In a process for the purpose set forth the embedding of the material to be treated in a liquid air saturated heat insulating body arranged within a metallic cylinder positioned in a heat insulating body, and then simultaneously passing through an insulated metallic tubing in coiled peripheral contact with the cylinder a direct electrical current and liquid air.

In testimony whereof, I affix my signature hereto.

ROBERT W. SILER.